United States Patent [19]

Rechlicz

[11] 4,075,184
[45] Feb. 21, 1978

[54] METHOD OF SULFONATING FLUOROCARBON POLYMERS AND FLUOROCARBON POLYMER PRODUCED THEREBY

[75] Inventor: Thomas A. Rechlicz, Corpus Christi, Tex.

[73] Assignee: PPG Industries, Inc., Pittsburgh, Pa.

[21] Appl. No.: 665,743

[22] Filed: Mar. 11, 1976

[51] Int. Cl.$^2$ .............................................. C08G 75/00
[52] U.S. Cl. ............................. 260/79.3 R; 260/2.2 R
[58] Field of Search ........................ 260/79.3 R, 2.2 R

[56] References Cited

U.S. PATENT DOCUMENTS

| B 493,537 | 3/1976 | Kolb | 260/79.3 R |
|---|---|---|---|
| 2,586,363 | 2/1952 | McAlevy | 260/79.3 R |
| 3,642,728 | 2/1972 | Canter | 260/79.3 R |
| 3,875,096 | 4/1975 | Graefe et al. | 260/79 R |
| 3,887,530 | 6/1975 | O'Farrell et al. | 260/79.3 R |
| 3,933,732 | 1/1976 | Schmiegel | 260/79.3 R |

FOREIGN PATENT DOCUMENTS 883,380  11/1961  United Kingdom ........... 260/79.3 R

OTHER PUBLICATIONS

Journal of the American Chemical Society, vol. 58, 1936, pp. 1348–1352.

Primary Examiner—Ronald W. Griffin
Attorney, Agent, or Firm—Richard M. Goldman

[57] ABSTRACT

Disclosed is a method of sulfonating polymers having chlorotrifluoroethylene moieties. According to the disclosed method, a liquid composition containing the polymer, an excess of thiourea, and a solvent is maintained above about 100° C. at a pressure sufficient to maintain the composition liquid. A polymer product having trifluoroethylene sulfonic acid and chlorotrifluoroethylene moieties is recovered. Also disclosed is a polymer having $(CX_1X_2\text{-}CX_3X_4)$, $(CF_2\text{-}CFCl)$, and $(CF_2\text{-}CF(SO_3H))$ moieties where $X_1$, $X_2$, $X_3$, and $X_4$ may be hydrogen or fluorine.

7 Claims, No Drawings

METHOD OF SULFONATING FLUOROCARBON POLYMERS AND FLUOROCARBON POLYMER PRODUCED THEREBY

DESCRIPTION OF THE INVENTION

Sulfonated fluorocarbons are useful in providing ion exchange membranes, microporous membranes, dialysis membranes, and permionic membranes particularly well suited for use in corrosive environments. Sulfonated fluorocarbons, however, are difficult to synthesize because of the stability of the perfluorinated structure. Hydrogen-containing chloropolymers such as polyvinylchloride and polyvinylidene chloride are easily sulfonated, for example, by reaction with thioureas to form isothiouronium salts such as is disclosed in United Kingdom Patent Specification No. 883,380 to Solvay for Process For The Sulphochlorination of Polymers Containing Chlorine. It has now been found that polymers containing chlorotrifluoroethylene moieties may be sulfonated by reaction with thioureas under vigorous conditions of temperature and pressure, in this way yielding polymers useful in the fabrication of permionic membranes, microporous membranes, dialysis membranes, and ion exchange membranes. As used herein, membranes include both liquid permeable barriers such as chlor-alkali diaphragms and liquid impermeable ion selective barriers.

DETAILED DESCRIPTION OF THE INVENTION

According to the method described herein, there is provided a means for sulfonating polymers having chlorotrifluoroethylene moieties, for example, a homopolymer of polychlorotrifluoroethylene having the repeating unit:

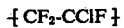

Additionally, there is disclosed a method of sulfonating a copolymer having chlorotrifluoroethylene moieties and having the repeating units:

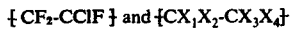

where $X_1$, $X_2$, $X_3$, and $X_4$ may be hydrogen or fluorine. These moieties include ethylene $\{CH_2\text{-}CH_2\}$, vinylfluoride $\{CH_2\text{-}CHF\}$, vinylidene fluoride $\{CH_2\text{-}CF_2\}$, difluoroethylene $\{CHF\text{-}CHF\}$, trifluoroethylene $\{CHF\text{-}CF_2\}$, and perfluoroethylene $\{CF_2\text{-}CF_2\}$ moieties.

In this way, the method herein described yields a sulfonated polymeric product containing trifluorovinyl sulfonic acid moieties:

The sulfonic acid-containing moiety may be present as the alkali metal salt, i.e., as a sodium salt or a potassium salt, or as the hydrogen acid, or as the sulfonyl chloride. Whenever a sulfonic acid-containing moiety is referred to herein, it is to be understood that all of the above forms, i.e., the alkali metal salt, the hydrogen acid, and the sulfonyl chloride, are contemplated thereby unless an intent to the contrary clearly appears from the context.

The trifluorovinyl sulfonic acid-containing moiety may be produced from a homopolymer of chlorotrifluoroethylene where the homopolymer reactant is not completely sulfonated, yielding a copolymer of chlorotrifluoroethylene and trifluorovinyl sulfonic acid with the repeating units:

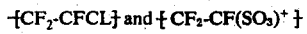

Alternatively, the polymeric material contemplated herein may be the product of the sulfonation of a copolymer of chlorotrifluoroethylene and either ethylene or a partially fluorinated hydrocarbon, having the repeating units:

where $X_1$, $X_2$, $X_3$, and $X_4$ are chosen from the group consisting of fluorine and hydrogen. In this way, a polymeric product is produced having the repeating units:

where $X_1$, $X_2$, $X_3$, and $X_4$ may be hydrogen or fluorine, and where the ratio of the trifluorovinyl sulfonic acid moiety to chlorotrifluoroethylene moiety is from about 0.1 to about 10, i.e., where the ratio

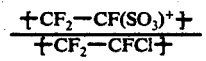

is from about 0.1 to about 10. Ratios of the trifluorovinyl sulfonic acid to the chlorotrifluoroethylene of less than about 0.1, while possible using the method of this invention, do not provide a material offering particularly desirable permionic membrane or ion exchange membrane capabilities relative to the unsulfonated material.

Materials having a ratio of trifluorovinyl sulfonic acid to chlorotrifluoroethylene greater than about 10, while satisfactory as a permionic membrane material or ion exchange resin material, require a substantial excess of thiourea as will be described hereinafter, for example, with refluxing or recycling of the liquid composition in order to maintain a substantial excess of thiourea in the composition.

Most frequently the second polymer of the reagent copolymer, i.e., the third polymer of the product terpolymer, will be ethylene $\{CH_2\text{-}CH_2\}$, vinylfluoride $\{CH_2\text{-}CHF\}$, vinylidene fluoride $\{CH_2\text{-}CF_2\}$, or perfluoroethylene $\{CF_2\text{-}CF_2\}$. The resulting polymeric products typically have a molecular weight of from about 100,000 to about 1,000,000 or more and an equivalent weight, i.e., grams of polymer per mole of sulfonic acid side group, of from about 500 to about 3,000 and preferably from about 700 to about 2,000.

The sulfonated fluorocarbon polymer may be used in the fabrication of permionic membranes, in the fabrication of ion exchange membranes, in the fabrication of electrodialysis membranes and microporous diaphragms. The resulting products exhibit hydrophilic and ion selective properties.

According to the method of this invention, the sulfonated fluorocarbons are prepared by providing a liquid composition of a fluorine-containing polymer, a stoichiometric excess of thiourea, and a solvent. The liquid composition is maintained above about 100° C. for a long enough time to obtain the desired degree of sulfonation at an elevated pressure sufficient to maintain the liquid composition liquid. Thereafter, a polymer is recovered having trifluoroethylene sulfonic acid moieties.

A polymer containing chlorotrifluoroethylene moieties, that is, either polychlorotrifluoroethylene or a copolymer having the empirical formula

where $X_1$, $X_2$, $X_3$, and $X_4$ are hydrogen or fluorine is present in the liquid composition at a concentration of from about 0.1 chlorotrifluoroethylene unit per liter to about 1.0 chlorotrifluoroethylene unit per liter and preferably from about 0.2 chlorotrifluoroethylene unit per liter to about 0.5 chlorotrifluoroethylene unit per liter. The polymer itself may be present as a liquid or as a swollen solid network or as large clumps of solid material in the solvent.

The thiourea may be present as unsubstituted thiourea having the structural formula

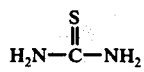

or as a substituted thiourea having the structural formula

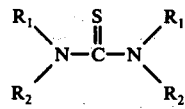

where $R_1$, $R_2$, $R_3$, and $R_4$ may be hydrogen or a lower alkyl such as methyl group ($-CH_3$), the ethyl group ($-C_2H_5$), the propyl group ($-C_3H_7$), or the butyl group ($-C_4H_9$). A preferred substituted thiourea contemplated to be useful in the method of this invention is tetramethyl thiourea. Whenever the term thiourea is used herein unsubstituted thioureas and substituted thioureas are contemplated thereby unless the contrary clearly appears from the context. In order to provide a satisfactory reaction, the concentration of thiourea should be a stoichiometric excess, for example, about twice the concentration of chlorotrifluoroethylene units per liter. As a general rule, the concentration of thiourea should be about 2½ to about 4 times the concentration of chlorotrifluoroethylene groups to actually be sulfonated. That is, there should be about a 2½ to about a 4 fold excess of the thiourea.

The solvent should be any inert organic solvent which is capable of either solubilizing, swelling, or partially swelling the fluorine-containing polymer. Suitable contemplated solvents include alcohols, such as methyl alcohol, ethyl alcohol, isopropyl alcohol, propyl alcohol, pentanol, ethylhexyl alcohol, cyclohexanol, and the like. Other solvents contemplated as being useful in the method of this invention include ketones such as acetone, methylethyl ketone, cyclohexanol, and the like. Alternatively, additional solvents contemplated as being useful in the method of this invention include halogenated hydrocarbons such as carbon tetrachloride, perchloroethylene, trichloroethylene, and the like.

The liquid composition exhibits lumps, clumps, or globules of partially swollen polymer. The liquid composition is maintained at a temperature above about 100° C., for example, from about 100° C. up to the boiling point of the liquid composition, or, when reflux is used, to a temperature above the boiling point of the composition. The pressure should be high enough to keep the solvent from vaporizing within the reaction vessel. At the temperatures herein contemplated, the pressure within the reaction vessel should be above about 100 pounds per square inch, preferably from about 110 to about 300 pounds per square inch whereby to maintain the composition substantially liquid. The temperature is maintained above about 100° C. for at least about 12 hours and generally from about 16 to about 48 hours, and preferably from about 24 to about 30 hours, in order to obtain high yields of the isothiouronium salt.

According to one exemplification of this invention, the isothiouronium salt may be reacted with a strong alkali, for example, sodium hydroxide or potassium hydroxide, to yield a thiol. According to an alternative exemplification of this invention, the isothioronium salt may be reacted with chlorine to yield the sulfonated chloride.

According to the method of this invention where a thiol product is to be produced, a liquid composition of the isothiouronium polymer in a dilute aqueous alkali metal hydroxide is prepared. The alkali metal hydroxide may be sodium hydroxide or potassium hydroxide. The liquid composition is heated in order to form the sodium thiol. The liquid composition typically contains from about 10 to about 50 weight percent alkali metal hydroxide and from about 10 to about 50 weight percent isothiouronium polymer. The resulting liquid composition is maintained at a temperature between about 80° C. and the boiling point of the composition. For example, the isothiouronium polymer may be placed in a 10 weight percent solution of sodium hydroxide to give a composition that is 10 weight percent polymer and heated to approximately the boiling point of the aqueous sodium hydroxide for a period of time in excess of half an hour, for example, from about half an hour to about three hours, in order to form sodium thiol.

According to an alternative exemplification of this invention, the isothiouronium may be placed in water, for example, distilled water, and chlorine may be bubbled through, for example, with a sparger tube or the like, in order to form sulfonyl chloride. Because of the exothermic nature of the reaction, it may be desirable to cool the water while chlorinating the isothiouronium salt.

The invention may more particularly be understood with reference to the following examples.

EXAMPLE I

A copolymer of chlorotrifluoroethylene and ethylene was reacted with thiourea to yield the isothiouronium salt which was then reacted with sodium hydroxide to yield the sodium thiol.

Ten grams of Allied Chemical Corporation HALAR brand ethylenechlorotrifluoroethylene copolymer containing approximately 26 weight percent chlorine was mixed with 10.5 grams of thiourea in 200 cubic centimeters of methylethyl ketone solvent. This was placed in a 300 cubic centimeter nickel autoclave. The autoclave was flushed with nitrogen for about 15 minutes and then sealed. The temperature of the solution was maintained at 200° C. at a pressure of 75 to 90 pounds per square inch for 48 hours.

Thereafter, the temperature was reduced and the autoclave opened. A light brown liquid was found in the autoclave and a coating was found on the walls and internal parts of the autoclave. This coating was scraped off, placed in a funnel, and washed with 300 milliliters of acetone. The resulting black substance was placed in 60 milliliters of a 10 weight percent aqueous solution of sodium hydroxide, stirred with a magnetic stirrer, and heated to 100° C. for one hour. The resulting product was then filtered in a Buchner filter, rinsed with distilled water, and dried in a vacuum oven. The resulting polymer had a chlorine content of less than 2 percent and a sulfur content of 8.4 weight percent.

EXAMPLE II

A copolymer of chlorotrifluoroethylene and ethylene was reacted with thiourea to yield the isothiouronium compound which was thereafter reacted with chlorine to yield the sulfonyl chloride.

Ten grams of Allied Chemical Corporation HALAR chlorotrifluoroethylene-ethylene copolymer containing approximately 26 weight percent chlorine and 5.25 grams of thiourea were added to 200 milliliters of methylethyl ketone in a 300 cubic centimeter nickel autoclave. The nickel autoclave was flushed with nitrogen and pressurized with nitrogen to 150 pounds per square inch. The liquid composition was then heated to 150° C., pressurized to 260 pounds per square inch, and maintained thereat for 24 hours. Thereafter, the autoclave was cooled and depressurized and a greenish powder was obtained upon filtration. This greenish powder was heated in hot methanol and refiltered. The powder was then boiled in 10 weight percent sodium hydroxide for about 2 hours and filtered on a Buchner funnel. The resulting product was thereafter washed with distilled water. A sample of the product was analyzed by X-ray fluorescence and found to contain 3.5 weight percent sulfur and 24 weight percent chlorine. The resulting product had a cation exchange capacity of 0.642-0.694 milliequivalents per gram.

EXAMPLE III

A copolymer of vinylidene fluoride and chlorotrifluoroethylene was reacted with thiourea to yield the isothiouronium salt which was then reacted with chlorine to yield the sulfonyl chloride.

A composition was prepared containing 20.7 grams of 3M Corporation "KEL-F-800" brand vinylidene fluoride-chlorotrifluoroethylene copolymer and 2 grams of thiourea with 500 cubic centimeters of methylethyl ketone in a one liter flask. The composition was refluxed for 24 hours.

Thereafter, a polymer was precipitated with excess methanol. The precipitate was placed in a liquid composition of 500 cubic centimeters of distilled water and 125 cubic centimeters of isopropanol. The composition was maintained between 5° C. and 10° C. while chlorine gas was passed through the composition for two hours. The resulting product was collected on a Buchner funnel, placed in dilute, boiling $H_2SO_4$ for 1 hour, and dried in a vacuum oven. The resulting product had a cation exchange capacity of 0.213 milliequivalents per gram.

EXAMPLE IV

A chlorotrifluoroethylene homopolymer was reacted with thiourea to yield the isothiouronium salt which was then reacted with chlorine to yield the thionyl chloride.

A composition was prepared containing 10.0 grams of 3M Corporation "KEL-F-81" (TM) brand chlorotrifluoroethylene homopolymer, 2.0 grams of thiourea, and 200 cubic centimeters of methylethyl ketone. The composition was placed in a 300 cubic centimeter nickel autoclave. The autoclave was initially pressurized to 150 pounds per square inch with nitrogen. The composition was heated to 150° C. and pressurized to 250 pounds per square inch for 9 hours.

The resulting mixture was filtered on a millipore filter and rinsed with acetone. The solid was placed in a liquid composition of water and methanol, maintained between 5° C. and 10° C. with an ice bath, and chlorine was passed through the liquid composition for two hours. The resulting product was collected on a Buchner funnel, placed in dilute boiling $H_2SO_4$ for 1 hour, and dried in a vacuum oven. The resulting product had a cation exchange capacity of 0.238 milliequivalent per gram.

While the invention has been described with reference to specific exemplifications and embodiments thereof, it is not intended to be so limited except as described in the claims appended hereto.

I claim:

1. A method of preparing a polymer having trifluoroethylene sulfonyl moieties comprising:
   providing a liquid composition comprising a polymer having chlorotrifluoroethylene moieties, a stoichiometric excess of a thiourea compound, and an organic solvent;
   maintaining the liquid composition above about 100° C. and at a pressure sufficient to maintain the composition liquid for a time sufficient to form a polymer having trifluoroethylene isothiouronium salt moieties; and
   thereafter converting the polymer having trifluoroethylene isothiouronium salt moieties to a polymer having trifluoroethylene sulfonyl moieties.

2. The method of claim 1 wherein the thiourea compound is chosen from the group consisting of thiourea and substituted thioureas.

3. The method of claim 1 comprising contacting the polymer having trifluoroethylene isothiouronium salt moieties with chlorine whereby to form a polymer having trifluoroethylene sulfonyl chloride moieties.

4. The method of claim 1 comprising providing an aqueous composition containing the polymer having trifluoroethylene isothiouronium salt moieties and an alkali metal hydroxide, and heating the aqueous composition for a long enough period of time to form the alkali metal thiol.

5. A polymeric material consisting essentially of $\{CF_2\text{-}CFCL\}$ and $\{CF_2\text{-}CF(SO_3)^+\}$ moieties.

6. A polymeric material consisting essentially of $\{CX_1X_2\text{-}CX_3X_4\}$, $\{CF_2\text{-}CFCL\}$, and $\{CF_2\text{-}CF(SO_3)^+\}$ moieties where $X_1$, $X_2$, $X_3$, and $X_4$ are chosen from the group consisting of H and F.

7. The polymeric material of claim 6 having an equivalent weight of from about 700 to about 2,000.

* * * * *